Jan. 24, 1961 C. L. MAMZIC 2,969,080
PNEUMATIC CONTROL APPARATUS
Filed Sept. 4, 1958 2 Sheets-Sheet 1

INVENTOR
Charles L. Mamzic
BY
ATTORNEY

Jan. 24, 1961
C. L. MAMZIC
2,969,080
PNEUMATIC CONTROL APPARATUS
Filed Sept. 4, 1958
2 Sheets-Sheet 2
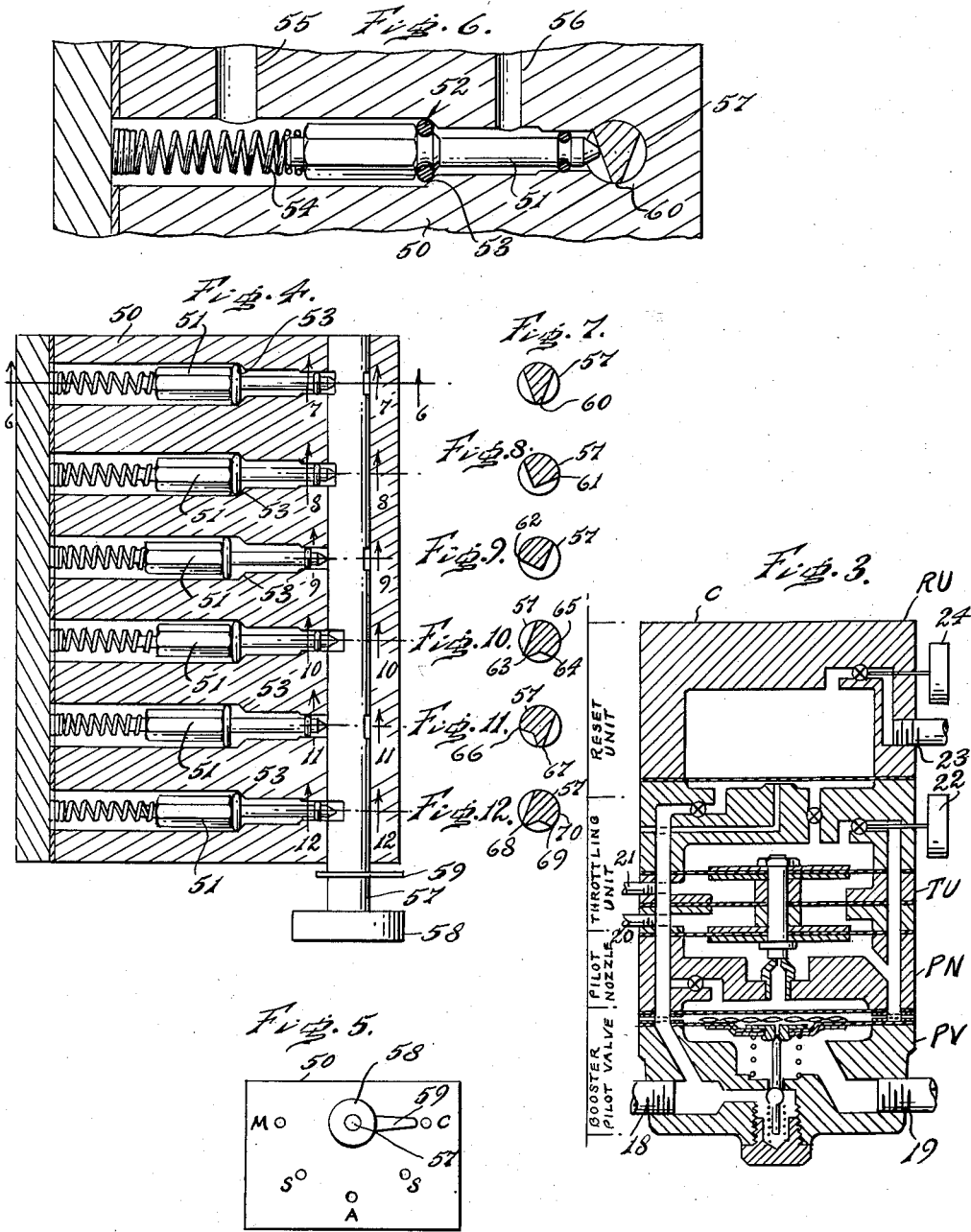
INVENTOR
Charles L. Mamzic
BY
ATTORNEY

United States Patent Office 2,969,080
Patented Jan. 24, 1961

2,969,080

PNEUMATIC CONTROL APPARATUS

Charles L. Mamzic, Philadelphia, Pa., assignor to Moore Products Co., Philadelphia, Pa., a corporation of Pennsylvania Filed Sept. 4, 1958, Ser. No. 758,968

8 Claims. (Cl. 137—84)

This invention relates to pneumatic control apparatus and more particularly to a pneumatic circuit in which a plurality of transmitters responsive to different conditions are employed with a plurality of controllers so that the element to be controlled can be manually controlled, automatically controlled by one controller, or the controllers operated in a cascade arrangement.

In the automatic control of a condition, it has heretofore been common practice to employ measuring means for determining the value of the condition, error detecting means for determining the deviation of the value of the condition from a desired level, and controlling means for regulating the flow of energy to the system so as to restore the value of the condition to the desired level.

With transmitters of the pressure fluid operated type, an air pressure is transmitted proportional to the value of the condition, and the controller to which the transmitter is connected is employed for transmitting a pneumatic pressure proportional to the error or deviation of the condition from the desired level and also to a time integral of the error.

In such controllers, the desired level of the condition may be established by an external source of pneumatic pressure proportional to the desired level of the condition. This pressure, which can be referred to as a control point setting pressure, is compared to the pressure from the transmitter, which can be designated as the process pressure.

With certain available types of controllers, upon the comparison of the process and control point setting pressures, a controller output pressure is transmitted by the controller to a pneumatically actuated valve or other control device. The common practice is to supply the control point setting pressure from a manually set pressure regulator. However, it is advantageous under certain circumstances to use for the control point setting pressure the output of another controller.

When one controller serves as the source of the control point setting pressure for another, the two controllers are said to be in cascade. Each controller would have its own condition transmitter furnishing it with a process pressure and each controller would vary its output pressure so as to maintain its process pressure at the level defined by its respective control point setting pressure.

In cascade automatic control systems it is frequently advantageous to provide a manual bypass arrangement whereby a final control element may be loaded with a manually adjustable pressure. The source of the pressure for the final control element on manual control may be the same regulator as is used for control point setting of the primary controller since, under the condition of manual control, the primary controller is essentially inactive and performing no useful function. However, when this is done the reset action of the primary controller, by its integrating action, may accumulate an error, because of the possible differences, under these conditions, of the process pressure and the control point setting pressure delivered to the primary controller.

A similar situation will arise if the control point setting regulator is employed to furnish the control point setting pressure for the secondary controller, as will occur if the system is operated as a simple automatic control without the cascade feature.

In order to prevent the accumulation of a reset error, it is possible to employ switching arrangements which will vent the reset chamber of the controller to the desired pressure immediately prior to switching to the cascade arrangement. The time constants and possible leakage in pneumatic systems, however, leaves much to be desired in such switching arrangements.

It is the principal object of the present invention to provide control apparatus having primary and secondary controllers in which the necessity for such switching as heretobefore required is eliminated, and the reset pressures of both controllers are continuously maintained at the desired levels so that a bumpless transfer can be effected between any of the three desired arrangements; that is, cascade control, automatic control of the final element by the secondary controller alone, and manual control of the final element.

It is a further object of the present invention to provide pneumatic control apparatus having a plurality of controllers each responsive to a transmitted process pressure and having a pneumatically set control point, the process pressures and control point setting pressures being variable over the same range, and each controller having a pneumatic output pressure, and a separate feedback connection for governing the reset or the integrating action.

It is a further object of the present invention to provide a cascade control system employing primary and secondary controllers with provisions for either manual or simple automatic control and in which the output of the secondary transmitter can be delivered, as desired, to the feedback connection of the primary controller.

It is a further object of the present invention to provide a cascade control system having primary and secondary controllers with a passageway or connection between the feedback connection of the primary controller and the control point connection of the secondary controller.

It is a further object of the present invention to provide a pneumatic control system having primary and secondary controllers in which, by a simple switching operation, the system can be employed for cascade control, automatic control only by the secondary controller, or manual control.

Other objects and advantageous features of the invention will be apparent from the description and claims.

The nature and characteristic features of the invention will be more readily understood from the following description, taken in connection with the accompanying drawings forming part thereof, in which:

Fig. 3 is a diagrammatic view of one form of controller suitable for use in connection with the invention;

Fig. 4 is a horizontal central sectional view through one form of switch suitable for use in connection with the present invention;

Fig. 5 is a fragmentary front elevational view of the switch shown in Fig. 4;

Fig. 6 is a vertical sectional view, enlarged, taken approximately on the line 6—6 of Fig. 4; and Figs. 7, 8, 9, 10, 11 and 12 are transverse sectional views taken approximately on the lines 7—7, 8—8, 9—9, 10—10, 11—11 and 12—12, respectively, of Fig. 4, showing the corresponding arrangements of the cam surfaces on the switch shaft, and in the positions for cascade operation.

It should, of course, be understood that the description and drawings herein are illustrative merely, and that various modifications and changes can be made in the structure disclosed without departing from the spirit of the invention.

Like numerals refer to like parts throughout the several views.

Figure 1:
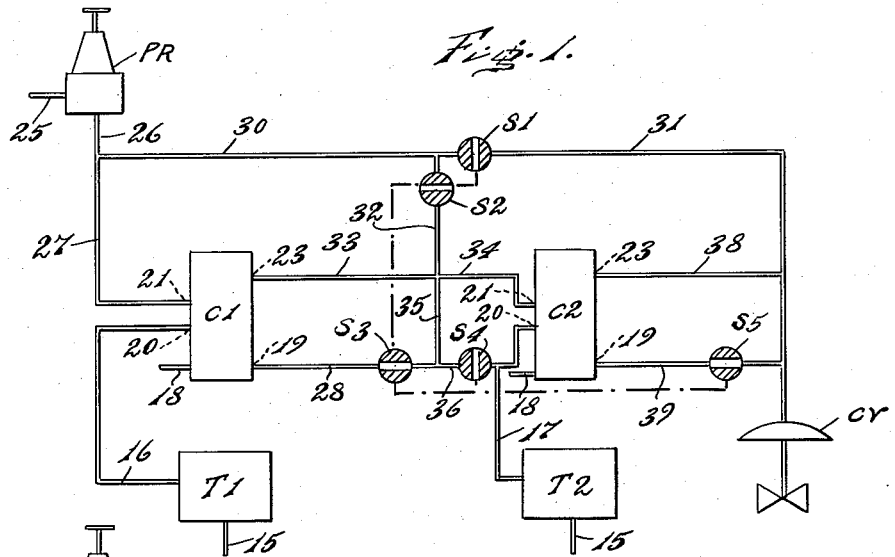
Figure 1 is a schematic arrangement of one form of pneumatic control apparatus in accordance with the present invention.
Figure 2:
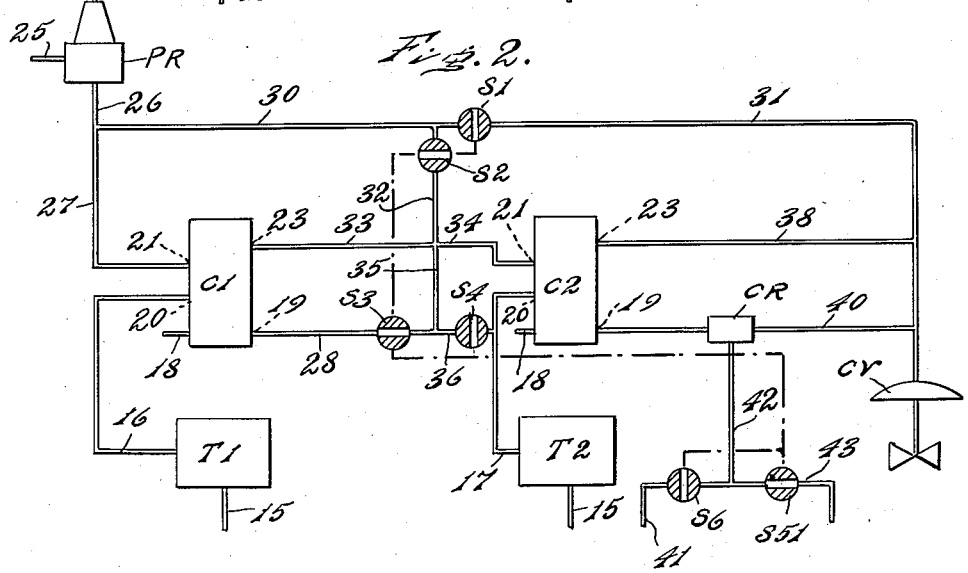
Fig. 2 is a schematic arrangement of pneumatic control apparatus in accordance with the present invention employed with a remote cutoff relay.

Referring now more particularly to Figs. 1 and 2 of the drawings, a primary transmitter T1 and a secondary transmitter T2 are provided which may be of any preferred type, such as those shown in prior U.S. Letters Patent No. 2,312,201 or No. 2,556,436. The transmitters T1 and T2 are each provided with a connection 15 to a source of fluid, such as air, under pressure and transmit, through fluid connections 16 and 17, fluid pressures proportional to the value of the condition at the particular locations where used in the system.

Merely by way of illustration the transmitter T1 can transmit a pneumatic pressure proportional to the temperature in a vessel (not shown) and the secondary transmitter T2 can transmit a pressure proportional to a secondary condition, for example, steam flow to the heating coils (not shown) of the vessel.

Primary and secondary controllers C1 and C2 are provided and can be of the pressure fluid operated type described in U.S. Letters Patent No. 2,518,244 and are adapted to transmit a pneumatic pressure proportional to the error or deviation of the condition from the desired level and also to a time integral of the error.

One suitable form of controller C is shown diagrammatically in Fig. 3. The controller C, as illustrated, is of the stack type with a booster pilot valve PV, having a supply connection 18 to any suitable source of fluid, such as air, under pressure, and a controller output pressure connection 19. The controller C, as shown, has a pilot nozzle section PN for controlling the booster pilot valve PV; a throttling unit TU, with fluid connections 20 and 21 for the application thereto as desired of a measured variable pressure such as that available from a transmitter, such as the transmitter T1 or T2, and a proportional band adjustment device 22; and a reset unit RU, with a reset rate adjustment device 24, and a feedback pressure connection 23.

A fluid pressure regulator PR is provided, connected by a fluid conduit 25 to a suitable source of fluid, such as air under pressure, and is adapted to transmit pressure through a delivery connection 26 at a selected or set level in accordance with the adjustment thereof. The delivery connection 26 of the fluid pressure regulator PR is connected by a fluid connection 27 to the control point setting connection 21 of the controller C1. The controller C1 has its output pressure supplied to a conduit 28. The transmitter T1 has the fluid conduit 16 thereof connected to the process input pressure connection 20 of the controller C1.

A fluid conduit 30 is provided connected to the fluid conduit 26 and a fluid conduit 31 is also provided and connected to the fluid conduit 30 and to a control element CV to be controlled, such, for example, as a diaphragm operated valve or other pressure fluid responsive motor device.

The fluid conduit 31 has a switch valve S1 interposed therein for purposes to be explained.

A fluid conduit 32 is provided, connected to the junction of the conduits 30 and 31, and has a switch valve S2 interposed therein. The fluid conduit 32 is connected to a fluid conduit 33 leading to the feedback input connection 23 of the controller C1 and to a fluid conduit 34 connected to the control point setting connection 21 of the controller C2.

The fluid conduit 28 is connected by a fluid conduit 35 to the fluid conduits 32, 33 and 34, and by a fluid conduit 36 to the connection 17 which leads to the process input pressure connection 20 of the controller C2. The fluid conduit 28 has a switch valve S3 interposed therein and the fluid conduit 36 has a switch valve S4 interposed therein.

The fluid conduit 31 is connected by a fluid conduit 38 to the feedback connection 23 of the controller C2.

Referring now specifically to Fig. 1, the output pressure connection 19 of the controller C2 is connected by a fluid conduit 39 to the fluid conduit 31, the conduit 39 having a switch valve S5 interposed therein.

Referring now specifically to Fig. 2, the controller output pressure connection 19 of the controller C2 is connected by a fluid conduit 40 through a cutoff relay CR to the fluid conduit 31. The cutoff relay CR is controlled by pressure fluid supplied from a suitable source of fluid, such as air, under pressure through a conduit 41 and a conduit 42 to which a venting fluid conduit 43 is also connected. The cutoff relay CR is preferably adapted to shut off flow when pressure is vented through the fluid conduit 43 and permit flow through the fluid connection 40 when fluid pressure is applied thereto through the conduit 42. A switch valve S51 is provided in the conduit 43 and a switch valve S6 is interposed in the fluid conduit 43.

The operation of switch valves S1 to S6, inclusive, as shown in Figs. 1 and 2, in timed relation will permit of attaining the desired switching.

One suitable form of simultaneous switching device is illustrated in Figs. 4 to 12, inclusive. For this purpose, a switch housing 50 is provided having a plurality of valve rods 51 therein with seating portions 52 for engagement with seats 53 and normally urged towards closed positions by springs 54 in engagement therewith, as shown particularly in Fig. 6. Fluid connections 55 and 56 on opposite sides of the seats 53 are shown for connection to the appropriate fluid conduits.

In order to open the switch valves S1 to S5 or S51 and S6, inclusive, in controlled relation a cam rod or shaft 57 is provided, operable in any desired manner such as by an external manually turnable knob 58 and provided with a pointer 59 for indicating its set positions. The rod or shaft 57 has a plurality of cam surfaces thereon as hereinafter pointed out.

The switching shaft 57 is provided with a cam face portion 60 (see Fig. 7) for moving the valve rod 51 for the valve S1 to open position at one of the selected positions thereof, the switching valve S1 otherwise remaining closed.

The switching shaft 57 is provided with a cam face portion 61 (see Fig. 8) for moving the valve rod 51 for the valve S2 to open position at one of the selected positions thereof, the switching valve S2 otherwise remaining closed.

The switching shaft 57 is provided with a cam face portion 62 (see Fig. 9) for moving the valve rod 51 for the valve S3 to open position at one of the selected positions thereof, the switching valve S3 otherwise remaining closed.

The switching shaft 57 is provided with a plurality of cam portions 63, 64 and 65 (see Fig. 10) for moving the valve rod 51 for the valve S4 to open position at three selected positions thereof, the switching valve S4 otherwise remaining closed.

The switching shaft 57 is provided with a plurality of cam portions 66 and 67 (see Fig. 11) for moving the valve rod 51 for the valve S5 or valve S51 to open position at two selected positions thereof, the switching valve S5 or S51 otherwise remaining closed.

The switching shaft 57 is provided with a plurality of cam portions 68, 69 and 70 (see Fig. 12) for moving the valve rod 51 for the valve S6 to open position at three selected positions thereof, the switching valve S6 otherwise remaining closed.

In Figs. 7 to 12, inclusive, the respective cam surfaces are shown in their related positions and for cascade operation so that by rotation of the switching shaft 57 to a particular position the valves S1 to S6, inclusive, will be open or closed in the desired relation and as required for the setting desired. With the switching shaft 57 in position for manual control (shown at M in Fig. 5) of the control element CV by pressure applied direct from the pressure regulator PR, the switching valve S1 is open and the switching valve S4 is open and in the form of the invention illustrated in Fig. 2, the switching valve S6 is also open, the remaining valves being closed.

Upon actuation of the switching shaft 57 from the position M for manual control to the position S for sealing (shown at S to the left on Fig. 5), the valve S1 is closed so that the pressure applied on the control element CV is sealed within the fluid conduit 31.

Upon actuation of the switching shaft 57 from the position S for sealing to automatic control (shown at A on Fig. 5) the valves S2 and S5 or S51 are opened, the remaining valves being closed. With the valve S2 open, the regulated output of the pressure regulator PR is supplied to the controller C2 for control point setting.

Upon shifting the switching shaft from the position A for automatic control to the position S (shown to the right on Fig. 5) for sealing, the pressure applied to the control element CV is sealed as before.

Upon shifting the switching shaft 57 from the position S for sealing to the position C for cascade operation (shown at C on Fig. 5), the switching valve S3 and S5 or S51 are open and the other valves are closed.

It will be noted that with the pneumatic circuit, as herein illustrated, the feedback connection 23 of the primary controller C1 is continuously connected to the control point connection 34 of the secondary controller C2.

It will also be noted that provisions are made for connecting the control point connection 21 of the secondary controller C2 and thus also the feedback connection 23 of the primary controller C1 to the output of the secondary transmitter T2 during the manual control mode of operation. During this mode of operation, the controller C1 is inactive, but it is necessary that its reset chamber be maintained at the correct pressure at all times so that when this controller C1 takes control in the cascade mode, no time will be lost in bringing the slow acting reset mechanism into balance. In the cascade mode, when the control point and measured variable pressures of the primary controller C1 are equal, the output of this controller C1 will be equal to the pressure accumulated in its reset chamber. Since this pressure is used for the control point setting of the secondary controller C2, it should be equal to the output of the secondary transmitter T2, so that the process will not be "bumped." During the manual mode, the operator will have manipulated the pressure regulator PR, to position the final control valve CV, to bring the secondary variable to the value which holds the primary variable at the desired point. There should be no change in the value of the secondary variable when the system is switched from the manual to the cascade mode. During the manual mode, there is no pressure except the output of the secondary transmitter T2 that will continuously condition the reset pressure of the primary controller C1 to prepare it for immediate operation at the correct value when the system is switched to the cascade mode.

I claim:

1. In pneumatic control apparatus, a fluid pressure responsive member to be controlled, a first fluid pressure controller responsive to a condition and having a pressure fluid output connection and a reset control portion with a fluid connection thereto, a second fluid pressure controller having a measured variable input connection and a pressure fluid output connection, a condition responsive fluid pressure transmitter having a pressure output connection connected to said second controller input connection, and switching means having a plurality of positions for determining the pressure applied at said fluid pressure responsive member, said switching means having portions for connecting the pressure output connection of the transmitter to the reset connection of the first controller.

2. Pneumatic control apparatus as defined in claim 1, having a fluid pressure responsive cutoff valve interposed between the output connection of said second controller and the fluid pressure responsive member.

3. In pneumatic control apparatus, a fluid pressure responsive member to be controlled, a first fluid pressure controller responsive to a condition and having a pressure fluid output connection, and a reset control portion with a fluid connection thereto, a second fluid pressure controller having a measured variable input connection, said second controller having a control point setting fluid pressure connection and a pressure fluid output connection, a condition responsive fluid pressure transmitter having a pressure output connection connected to said second controller input connection, members for connecting the pressure fluid output connection of the first controller to the control point setting connection of the second controller, a continuously operating fluid connection between the control point setting connection of the second controller and the reset fluid connection of the first controller, and members for connecting the pressure output connection of the transmitter to the reset connection of the first controller.

4. Pneumatic control apparatus as defined in claim 3 having a fluid pressure responsive cutoff valve interposed between the output connection of said second controller and the fluid pressure responsive member.

5. In pneumatic control apparatus, a fluid pressure responsive member to be controlled; a fluid pressure regulator connected to a source of fluid under pressure and having a controlled fluid pressure output; a first fluid pressure controller responsive to a condition and having a pressure fluid output connection, a control point setting fluid connection connected to said regulator output, and a reset control portion with a fluid connection thereto; a second fluid pressure controller having a measured variable input connection, and a pressure fluid output connection; a condition responsive fluid pressure transmitter having a pressure output connection connected to said second controller input connection, and switching means having a plurality of positions for determining the pressure applied to said fluid pressure responsive member, said switching means having portions for connecting the pressure output connection of the transmitter to the reset connection of the first controller.

6. Pneumatic control apparatus as defined in claim 5, having portions for selectively isolating the fluid pressure responsive member.

7. In pneumatic control apparatus, a fluid pressure responsive member to be controlled; a fluid pressure regulator connected to a source of fluid under pressure and having a controlled fluid pressure output; a first fluid pressure controller responsive to a condition and having a pressure fluid output connection, a control point setting fluid pressure connection connected to said regulator output, and a reset control portion with a fluid connection thereto; a second fluid pressure controller having an input connection for a pressure responsive to a condition, a pressure fluid output connection, and a control point setting fluid pressure connection; and switching means having three positions for determining the pressure applied to said fluid pressure responsive member, one each for the conditions of manual control, control by the second controller and cascade operation, said switching means having portions for manual control for direct connection of said pressure regulator to said fluid pressure responsive member, portions for control by the second controller establishing communication between the output connection of the second controller and the pressure responsive member and between the output connection of the pressure regulator and the control point setting connection of the second controller, and portions for cascade operation establishing communication between the output connection of the second controller and the pressure responsive member and between the output connection of the first controller and the control point setting connection of the second controller.

8. In pneumatic control apparatus, a fluid pressure responsive member to be controlled; a fluid pressure regulator connected to a source of fluid under pressure and having a controlled fluid pressure output; a first fluid pressure controller responsive to a condition and having a pressure fluid output connection, a control point setting fluid pressure connection connected to said regulator output, and a reset control portion with a fluid connection thereto; a second fluid pressure controller having an input connection for a pressure responsive to a condition, a pressure fluid output connection, and a control point setting fluid pressure connection; and switching means having five positions for determining the pressure applied to said fluid pressure responsive member, one each for the conditions of manual control, control by the second controller and cascade operation, and two positions for isolating said fluid pressure responsive member, said switching means having portions for manual control for direct connection of said pressure regulator to said fluid pressure responsive member, portions for control by the second controller establishing communication between the output connection of the second controller and the pressure responsive member and between the output connection of the pressure regulator and the control point setting connection of the second controller, portions for cascade operation establishing communication between the output connection of the second controller and the pressure responsive member and between the output connection of the first controller and the control point setting connection of the second controller, and portions for isolating said fluid pressure responsive member.

References Cited in the file of this patent

UNITED STATES PATENTS

| | | |
|---|---|---|
| 2,517,051 | Swenson | Aug. 1, 1950 |
| 2,638,921 | Caldwell et al. | May 19, 1953 |
| 2,743,710 | Shannon | May 1, 1956 |
| 2,747,595 | Dickey | May 29, 1956 |
| 2,834,362 | Gorrie et al. | May 13, 1958 |
| 2,851,047 | Eller | Sept. 9, 1958 |

Notice of Adverse Decision in Interference

In Interference No. 92,907 involving Patent No. 2,969,080, C. L. Mamzic, Pneumatic control apparatus, final judgment adverse to the patentee was rendered Feb. 1, 1963, as to claims 7 and 8.

[*Official Gazette April 30, 1963.*]